United States Patent [19]
Williams, Jr. et al.

[11] Patent Number: 5,161,054
[45] Date of Patent: Nov. 3, 1992

[54] PROJECTED VOLUME DISPLAY SYSTEM AND METHOD

[75] Inventors: Rodney Don Williams, Jr., Plano; Felix Garcia, Jr., Roundrock, both of Tex.

[73] Assignee: Texas Instruments Incorporated, Dallas, Tex.

[21] Appl. No.: 629,794

[22] Filed: Dec. 19, 1990

[51] Int. Cl.⁵ ............................................. G02B 27/22
[52] U.S. Cl. ..................................... 359/462; 359/479
[58] Field of Search ................ 350/130; 359/462, 471, 359/478, 479

[56] References Cited

U.S. PATENT DOCUMENTS 3,572,893  3/1971  Bennett et al. ..................... 350/130
4,674,837  6/1987  Knüttel et al. ..................... 350/130

*Primary Examiner*—Scott J. Sugarman
*Attorney, Agent, or Firm*—L. Joy Griebenow; Richard L. Donaldson; William E. Hiller

[57] ABSTRACT

A method of viewing a three dimensional display and structure therefor which comprises providing a three dimensional display, providing a projection surface which is a sector of a substantial spheroid, providing projection optics projecting the three dimensional display onto the projection surface and placing an observer within the substantial spheroid. In accordance with a second embodiment there is provided a method of viewing a three dimensional display comprising providing a double parabolic mirror, providing a three dimensional display within the double parabolic mirror, projecting an image of the three dimensional display external of the parabolic mirror and viewing the image from a location external of the double parabolic mirror.

22 Claims, 2 Drawing Sheets

PROJECTED VOLUME DISPLAY SYSTEM AND METHOD

CROSS-REFERENCE TO COPENDING APPLICATIONS

This application is an improvement of copending application Ser. No. 07/584,413, filed Sep. 17, 1990, now U.S. Pat. No. 5,042,909, the contents of which are incorporated herein by reference.

BACKGROUND OF THE INVENTION

1. Field of the Invention

This invention relates to a three dimensional display system and, more specifically, to a system for transferring and projecting a three dimensional image onto a screen or into space remote from the original three dimensional image.

2. Brief Description of the Prior Art

In accordance with the above noted copending application, a disk-like screen is connected to the end of a motor shaft. The disk is attached to the shaft of a motor at a 45 degree angle or compound helix shape, though this angle can be varied to provide a larger or smaller height or z-axis dimension, so that, as the disk rotates, a displacement of any given point thereon along the z-axis takes place. The image is formed on the screen by projecting a light beam, such as from a laser, through a modulator and toward a scanner which produces an x-y scan of the beam on a screen, the screen being the disk discussed hereinabove. The disk can be translucent, such as lucite, so that images can be projected thereon onto the front and/or rear surfaces thereof. The modulation or strobing of the scan is then synchronized with the rotating disk by control of the motor speed so that a three dimensional pattern appears on the screen. It can be seen that any point on the x-y scan from the scanner which impinges upon the screen will move along a z-axis direction since the screen or disk at that point produces such z-axis movement. This movement of the displayed image provides the three dimensional effect. The adjustment of the angle between the disk surface and the x-y plane of the scanned x-y image will determine the z-dimension or height of the three dimensional image, the disk angle being adjustable on-line, if so desired.

While the disk is a planar opaque screen for receiving a scanned image thereon on one surface thereof, the screen can take many other forms. For example, the disk can be translucent, such as lucite, and thereby be capable of receiving a scanned image thereon on both major surfaces. The lucite disk can be in the form of a pair of angularly truncated cylinders with the same truncation angle which fit together at the angularly truncated surfaces to form a new cylinder wherein the surfaces at which truncation takes place are translucent. In addition, the screen can take on shapes other than planar, it merely being necessary that at least some portion thereof move in the z-direction during rotation thereof while projection of the x-y image thereon takes place to provide the three dimensional image. As a further embodiment, the disk can be placed in a gas filled or evacuated CRT with the image impinging thereon being the scanned beam of the tube. Phosphors can be disposed on the disk which, when excited, will form the three dimensional image. As a still further embodiment, the screen can be planar and disposed normal to the projected x-y image. The three dimensional affect is then provided by moving the entire screen along the z-axis in synchronism with the scanned x-y image to provide the three dimensional affect. A cam driven shaft attached to the screen can provide such screen movement along the z-axis.

While the above described prior system provides a highly effective three-dimensional display, the fact that the display is so closely positioned with respect to the rapidly rotating disk makes it undesirable and dangerous for observers to be located close to the display. In addition, the display cannot be readily observed when the ambient light is significant. Accordingly, for example, if the system were to be used in the cockpit of an airplane and sunlight were to enter the cockpit, viewing of the display would be difficult if not impossible. It is therefore also the desire to provide a three dimensional display of the type described in the above noted copending application which can be viewed under almost any type of ambient light conditions.

SUMMARY OF THE INVENTION

In accordance with the present invention, the above noted problems of the prior art are eliminated and there is provided a system which is capable of projecting a three dimensional image remote from the points of origination of the initial three dimensional image which duplicates the original image. In this manner, one can operate directly with the duplicated image without the possibility of injury resulting from the high speed rotating disk and under substantially any type of ambient light.

Briefly, in accordance with one embodiment of the present invention, the three dimensional formed by the above described prior system is projected by projection optics onto a projection surface, preferably in the form of a half silvered mirror. The projection surface is preferably a sector of a sphere. The observer is located preferably within the sphere and sufficiently distanced from the disk to provide viewing of a three dimensional image as well as entry therein without incurring the dangers inherent from the rapidly rotating disk and the initial three dimensional image formed is shielded from ambient light.

In accordance with a second embodiment of the invention, a pair of parabolic mirrors are disposed in contact with each other along their circumferences to form a paraboloid. An opening is provided at the center of each parabolic mirror. The disk of the above described prior system is located within the paraboloid and the signal projected on the disk by the x and y scanners is formed into a three dimensional image within the paraboloid. This three dimensional image is projection off of the mirrors at the interior of the paraboloid through the opening provided at the center of the other parabolic mirror to provide a projected virtual image external to the paraboloid which can be viewed by a viewer.

DESCRIPTION OF THE PREFERRED EMBODIMENTS

Figure 1:
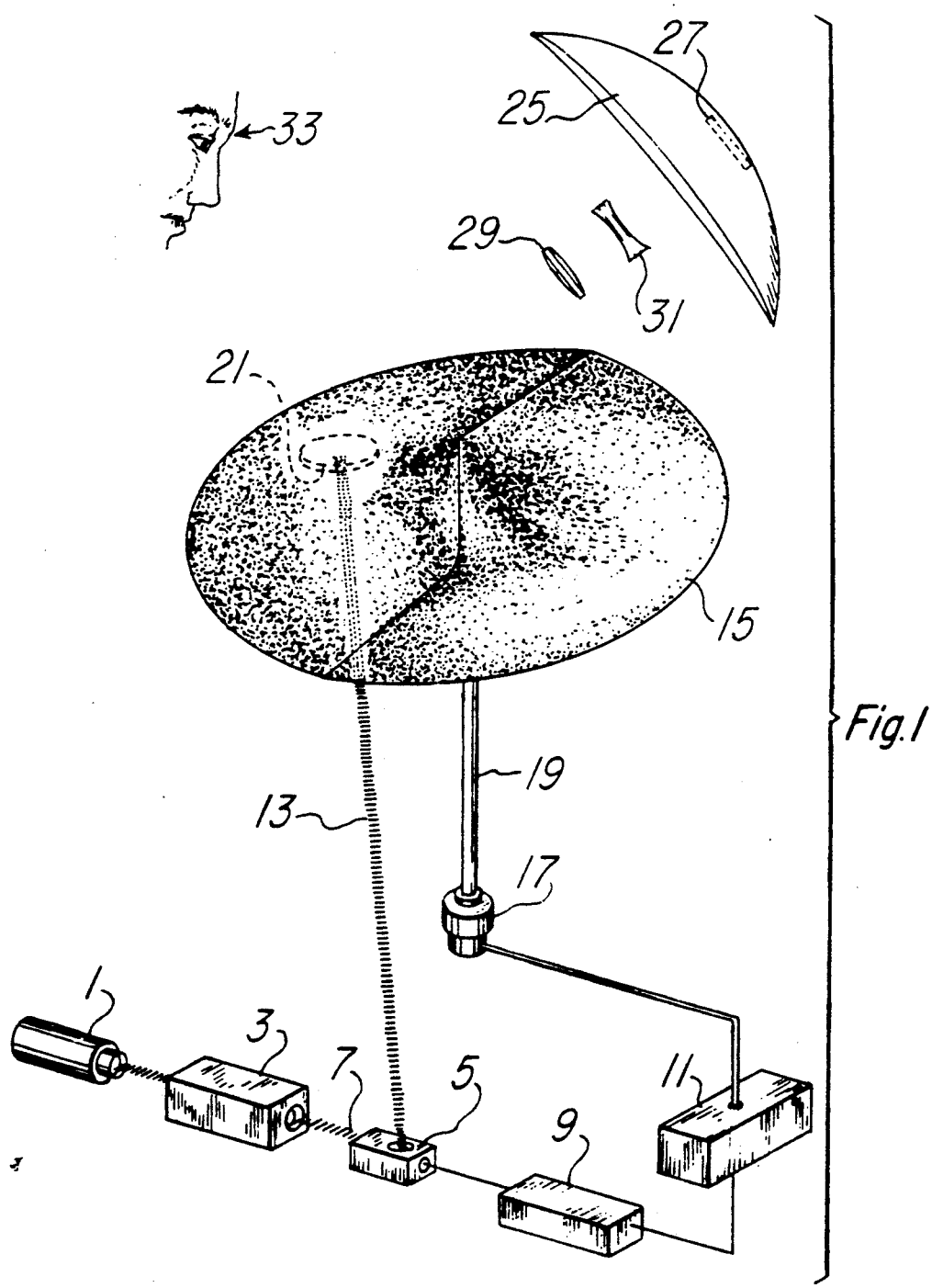
FIG. 1 is a schematic diagram in accordance with a first embodiment of the present invention.

Referring first to FIGURE there is shown a schematic diagram in accordance with a first embodiment of the projected volume display system in accordance with the present invention.

The system includes a laser 1 which projects a light beam through a modulator 3 onto an x-y scanner 5. The modulator 3 is externally controlled in predetermined manner (not shown) to control the intensity of the laser light beam 7 passing therethrough. It is understood that the light intensity can be controlled so that no light passes through the modulator, when so desired. The x-y scanner 5, whose scanning rate and position are controlled by x,y inputs 9 and synchronization electronics 11 are shown in detail in the above noted copending application. The x-y scanner 5 scans the light beam 7 from the modulator 3 along the x-y plane and projects this x-y image 13 onto a transparent screen 15, preferably polymethylmethacrylate. The screen 15 is in the form of a disk.

The screen 15 is rotated by a motor 17 under rotary speed control of the synchronization electronics 11 via a motor shaft 19 connected to the screen to form the three dimensional image 21. The rotary speed of the shaft 19 is preferably synchronized with the scanning rate of the scanner 5. A typical synchronization circuit is shown and described in FIG. 2 of the above noted patent application and is incorporated herein by reference. The angle of the screen 15 is preferably 45 degrees with respect to the direction of the image 13 from the scanner 5, it being understood that the z-dimension is a function of the angle of the screen.

The three dimensional image 21 formed by rotation of the screen 15 is projected through projection optics 23 onto a projection surface 25 whereat a three dimensional projected volume image is provided. The projection optics 23 is preferably a convex lens 29 followed by a concavey lens 31, it being understood that other lens systems capable of projecting the image 21 onto the projection surface 25 can also be used. The projection surface is preferably a half silvered-type mirror.

It can be seen that the rotation of the screen 15 with the x-y image 13 being projected thereon will result in the three dimensional image 21 as in the above noted prior application. This three dimensional image 21 is projected through projection optics 23 onto the projection surface 25 whereat an observer 33 can view the projected three dimensional image 27 without the dangers inherent in being located adjacent the rotating screen 15. Also, the observer 33 can be positioned within the projection surface 25 with the projection surface being shieldable from ambient light.

Figure 2:
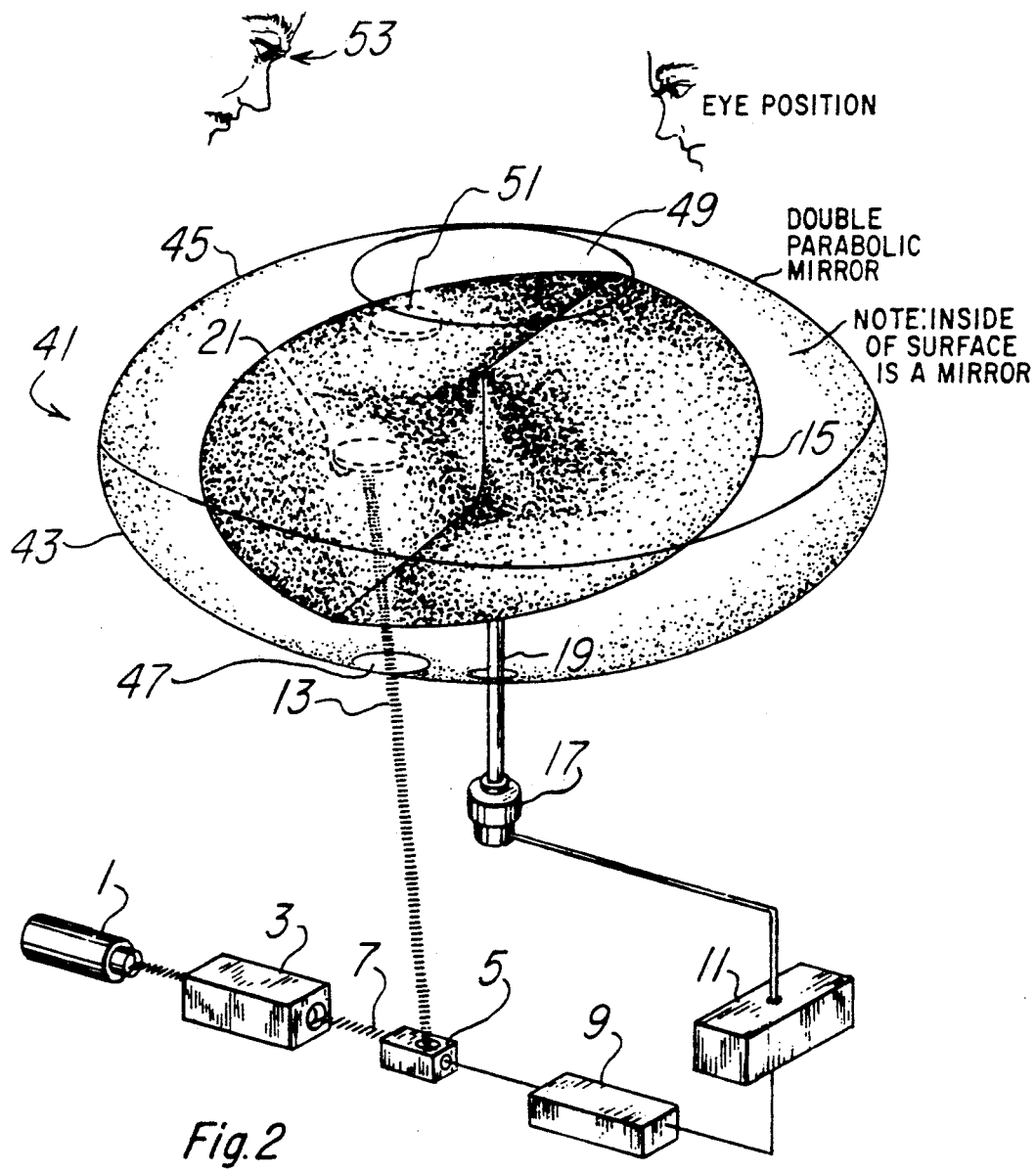
FIG. 2 is a schematic diagram in accordance with a second embodiment of the present invention.

Referring now to FIG. 2, there is shown a second embodiment of the present invention wherein like numbers represent the same or similar structure to that discussed above with reference to FIG. 1.

The laser 1, modulator 3 x-y scanner 5, x,y inputs 9 and synchronization electronics 11 are identical to those of FIG. 1 and provide the x-y image 13 on the screen 15. The screen 15 is rotated by motor 17 under control of the synchronization electronics 11 via shaft 19 as in the embodiment of FIG. 1. The screen 15 is disposed within a double parabolic mirror in the form of a paraboloid 42 composed of two parabolic mirrors 43 and 45 joined together at their perimeters. The parabolic mirror 43 has a centrally located aperture 47 through which the x-y image 13 travels onto the screen 15 which is located within the paraboloid 41. The three dimensional image 21 is formed within the paraboloid 41 and is projected onto and from the parabolic mirrors 43 and 45 and through an aperture 49 centrally located in the mirror 45 to form a virtual image 51 of the image 21 external to the paraboloid. An observer 53 can then view the virtual image 51 from a position remote from the screen 15.

Though the invention has been described with respect to specific preferred embodiments thereof, many variations and modifications will immediately become apparent to those skilled in the art. It is therefore the intention that the appended claims be interpreted as broadly as possible in view of the prior art to include all such variations and modifications.

We claim:

1. A display system which comprises:
   (a) an existing volumetric three dimensional display;
   (b) a projection surface; and
   (c) projection optics projecting said three dimensional display onto said projection surface.

2. The display system of claim 1 wherein said projection surface is a half-silvered mirror.

3. The display system of claim 1 wherein said projection surface is a sector of a hollow substantial spheroid, said display being projected onto the concave surface of said arc.

4. The display system of claim 2 wherein said projection surface is a sector of a hollow substantial spheroid, said display being projected onto the concave surface of said arc.

5. The display system of claim 1 wherein said projection optics comprises a lens with a convex surface followed by a lens with a concave surface.

6. The display system of claim 4 wherein said projection optics comprises a lens with a convex surface followed by a lens with a concave surface.

7. A method of viewing a three dimensional display comprising the steps of:
   (a) generating a volumetric three dimensional display;
   (b) providing a projection surface which is a sector of a substantial spheroid;
   providing projection optics projecting said three dimensional display onto said projection surface; and
   (d) placing an observer within said substantial spheroid.

8. The method of claim 7 wherein said projection surface is a half-silvered mirror.

9. The method of claim 7 wherein said projection optics comprises a lens with a convex surface followed by a lens with a concave surface.

10. The method of claim 8 wherein said projection optics comprises a lens with a convex surface followed by a lens with a concave surface.

11. A display system which comprises:
    (a) a three dimensional display; and
    (b) a double parabolic mirror encircling said display.

12. The display system of claim wherein said double parabolic mirror comprises a first parabolic mirror having an aperture at a central region thereof and a second parabolic mirror having an aperture at a central region thereof to provide a virtual projected image of said three dimensional display external of said double parabolic mirror.

13. The display system of claim 11 wherein said first parabolic mirror has a first circumference and said second parabolic mirror has said first circumference, said first and second parabolic mirrors being coupled together at said circumferences.

14. The display system of claim 12 wherein said first parabolic mirror has a first circumference and said second parabolic mirror has said first circumference, said first and second parabolic mirrors being coupled together at said circumferences.

15. The display system of claim 12 wherein said first and second parabolic mirrors each have a concave and a convex surface, the concave surface of each of said mirrors being highly reflective relative to the convex surface thereof.

16. The display system of claim 14 wherein said first and second parabolic mirrors each have a concave and z convex surface, the concave surface of each of said mirrors being highly reflective relative to the convex surface thereof.

17. A method of viewing a three dimensional display, comprising the steps of:
 (a) providing a double parabolic mirror;
 (b) providing a three dimensional display within said double parabolic mirror;
 (c) projecting an image of said three dimensional display external of said parabolic mirror; and
 (d) viewing said image from a location external of said double parabolic mirror.

18. The method of claim 17 wherein said double parabolic mirror comprises a first parabolic mirror having an aperture at a central region thereof and a second parabolic mirror having an aperture at a central region thereof to provide a virtual projected image of said three dimensional display external of said double parabolic mirror.

19. The method of claim 17 wherein said first parabolic mirror has a first circumference and said second parabolic mirror has said first circumference, said first and second parabolic mirrors being coupled together at said circumferences.

20. The method of claim 18 wherein said first parabolic mirror has a first circumference and said second parabolic mirror has said first circumference, said first and second parabolic mirrors being coupled together at said circumferences.

21. The method of claim 18 wherein said first and second parabolic mirrors each have a concave and a convex surface, the concave surface of each of said mirrors being highly reflective relative to the convex surface thereof.

22. The method of claim 20 wherein said first and second parabolic mirrors each have a concave and a convex surface, the concave surface of each of said mirrors being highly reflective relative to the convex surface thereof.

* * * * *